United States Patent
Porter (10) Patent No.: US 7,216,345 B1
(45) Date of Patent: May 8, 2007

(54) METHOD AND APPARATUS FOR PROTECTIVELY OPERATING A DATA/INFORMATION PROCESSING DEVICE

(75) Inventor: Swain W. Porter, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 0 days.

(21) Appl. No.: 09/544,492

(22) Filed: Apr. 7, 2000

(51) Int. Cl.
*G06F 9/46* (2006.01)

(52) U.S. Cl. ........... 718/100; 712/220; 713/164; 713/166; 726/2

(58) Field of Classification Search ........ 704/100, 704/101, 102, 103; 718/100–108, 1; 712/1–43, 712/200–248, 300; 711/1–6, 100–173, 200–221
See application file for complete search history.

(56) References Cited

U.S. PATENT DOCUMENTS

| | | | | |
|---|---|---|---|---|
| 3,916,385 A | * | 10/1975 | Parmar et al. | 711/109 |
| 4,177,510 A | * | 12/1979 | Appell et al. | 711/163 |
| 4,949,238 A | * | 8/1990 | Kamiya | 711/164 |
| 5,297,282 A | * | 3/1994 | Meilak et al. | 713/323 |
| 5,596,739 A | * | 1/1997 | Kane et al. | 711/152 |
| 5,768,594 A | * | 6/1998 | Blelloch et al. | 717/149 |
| 5,864,705 A | * | 1/1999 | Behnke | 712/32 |
| 6,154,818 A | * | 11/2000 | Christie | 711/163 |
| 6,393,556 B1 | * | 5/2002 | Arora | 712/229 |
| 6,895,491 B2 | * | 5/2005 | Kjos et al. | 711/203 |

OTHER PUBLICATIONS

Gareau, Jean. "Advanced Embedded X86 Programming: Protection and Segmentation." May 1998.*
Isa, Haruna R. et al. "A Multi-threading Architecture for Multilevel Secure Transaction Processing." IEEE. 1999.*

* cited by examiner

*Primary Examiner*—Lewis A. Bullock, Jr.
(74) *Attorney, Agent, or Firm*—Schwabe, Williamson & Wyatt, P.C.

(57) ABSTRACT

A privilege level re-mapping mechanism is provided to a processor to re-map privilege levels. The re-mapping mechanism is placed in between the control registers and the privilege checking circuitry, to enable the re-mapping to be dynamically performed in real time prior to privilege checking. The novel dynamic re-mapping of privilege levels prior to privilege checking enables tasks to be executed with relative privilege level relationships that are different from what were nominally assigned to the tasks. In one embodiment, complementary selection mechanism is also provided to enable the novel dynamic re-mapping to be conditionally performed.

29 Claims, 6 Drawing Sheets

Nominal Assignment

Actual Privilege Relationship Upon Re-mapping

METHOD AND APPARATUS FOR PROTECTIVELY OPERATING A DATA/INFORMATION PROCESSING DEVICE

BACKGROUND OF THE INVENTION

1. Field of the Invention

The present invention relates to the field of electronic data/information processing. More specifically, the present invention relates to methods and apparatuses for protectively operating data/information processing devices.

2. Background Information

The term "data/information processing devices" as used herein is intended to include all microprocessor based devices and/or systems, operated under the control of an operating system. Examples of these devices/systems include but are not limited to general as well as special purpose computing devices/systems, regardless of form factors, palm sized, laptops, desktops, rack mounted, and the like. Examples of special purpose computing devices include but are not limited to set-top boxes, wireless communication devices, and the like. The term "operating system" as used herein is intended to include all software provided to manage and facilitate application usage of hardware resources, however minimal the control and resource scope may be. Typical resource management functions of an "operating system" include task scheduling, memory management and the like. The term "task" as used herein is intended to include its common meaning of an executing instance of a program (a collection of programming instructions).

Ever since the early days of computing, computer systems have provided privilege protection to protect the system from being brought down by failures of non-essential programs, such as application programs. The IBM 360 systems provided a supervisor mode and a user mode to segregate privileged system programs and unprivileged user programs. The Multics (Multiplexed Information and Computing Service) developed by Massachusetts Institute of Technology, in cooperation with others, employed a 64 ring approach, combining access node and a triple of ring numbers (r1, r2, r3). In U.S. Pat. No. 4,177,510, issued to Appell et al., a hardware facilitated 4 ring approach is disclosed. Today, the Intel Architecture processors are known to provide a 4 ring hardware facilitated protection through the employment of memory segment descriptors and current task privilege level (CPL). However, partly because most of the other microprocessors remain having a two mode protection approach, the Windows® operating system, used in most Intel Architecture compatible processors, merely employ two of the four ring protection provided by the hardware. The kernel, virtual memory manager and various virtual device drivers (VxD) are executed in ring 0 (the most privileged level), while all other programs, including system services and so forth are executed out of ring 3 (the least privileged level). Rings 1 and 2 are not used.

The two levels of protection were reasonably adequate in the days when few programs are executed on most computer systems. Moreover, most of the computer systems operate by themselves, with few interactions from the outside world.

Advances in microprocessor, telecommunication and networking technology have dramatically expanded the applications of computing devices, and changed their operating environment. Today, most data/information processing systems are connected to private and/or public networks, such as the Internet, executing programs that are dynamically downloaded from a number of sources. Some sources are trustworthy, and their programs tend to be well behaved, but others are not.

Accordingly, a need exists to improve the protection of data/information processing systems, especially those operating with a two privilege level protection scheme.

However, this need cannot be easily met, even in the case of systems using Intel Architecture processors and Windows operating system, where there are two unused privileged levels, as the system services and other trustworthy applications are confined to run at the least privileged level (ring 3). It would undermine the stability of the systems, as opposed to increasing its protection, if untrustworthy applications are confined to execute out of the more privileged ring 1 or ring 2. Relocating the operating system services and other trustworthy programs off the least privileged level (Ring 3) without hardware assistance would require major redesign of the operating system, and raises serious backward compatibility issues. Extending the hardware to have the processor support more privilege levels beyond 4 rings would require major redesign of the processor, as greater than 4 rings would require at least one extra bit be added to the current 2-bit representation. This would cause major redesign to the entire privilege level mechanism, including control register layouts, width of internal data lines, size of comparison circuitry and the like.

Thus, it is further desirable if the need can be met without requiring major processor and/or operating system re-design.

SUMMARY OF THE INVENTION

A privilege level re-mapping mechanism is provided to a processor to re-map privilege levels The re-mapping mechanism is placed in between the control registers and the privilege checking circuitry, to enable the re-mapping to be dynamically performed in real time prior to privilege checking. The novel dynamic re-mapping of privilege levels prior to privilege checking enables tasks to be executed with relative privilege level relationships that are different from what were nominally assigned to the tasks.

In one embodiment, complementary selection mechanism is also provided to enable the novel dynamic re-mapping to be conditionally performed.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as privilege levels, control registers, and so forth, commonly employed by those skilled in the art to convey the substance of their work to others skilled in the art. Parts of the description will be presented in terms of operations performed by a computer system, using terms such as privilege checks, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
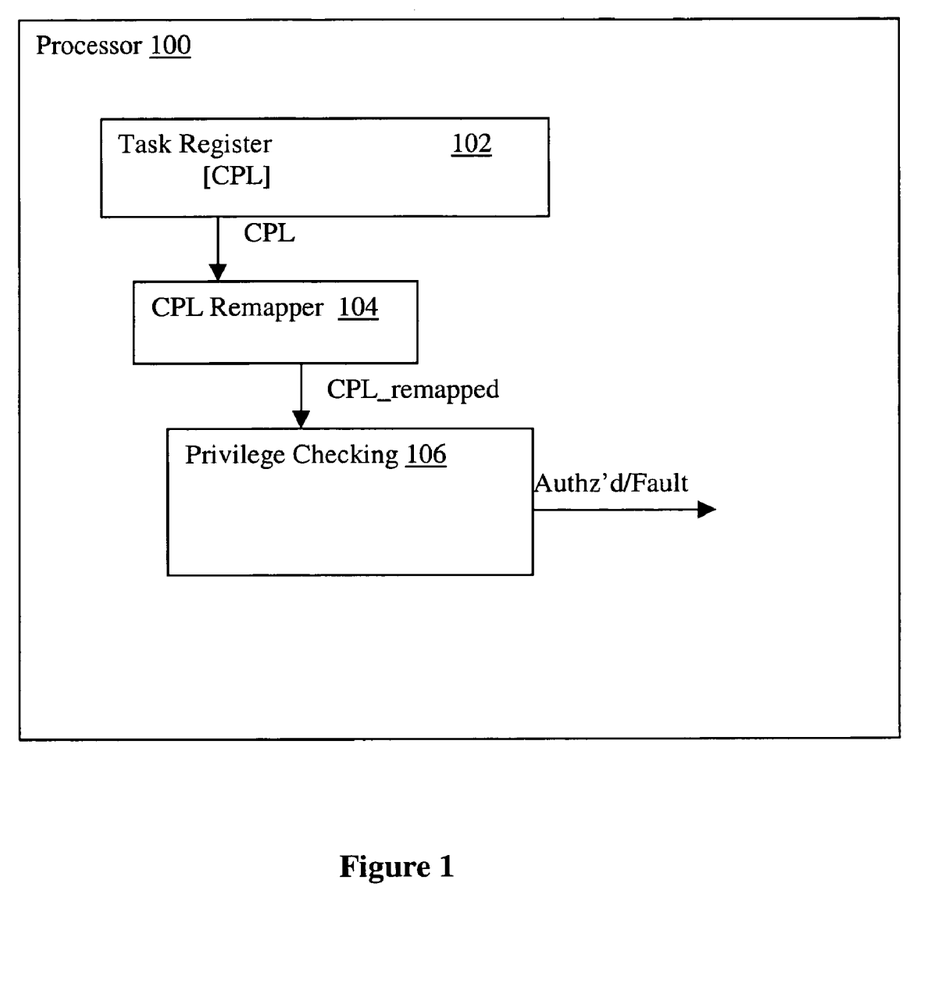
FIG. 1 illustrates an overview of the present invention, in accordance with one embodiment.

Referring now to FIG. 1, wherein an overview of the present invention in accordance with one embodiment is shown. As illustrated, in accordance with the present invention, a task current privilege level (CPL) remapper 104 that re-maps a task's CPL from one assigned level to another is provided to processor 100. Task CPL remapper 104 is strategically placed in between task register 102 (a control register where task CPL is stored) and privilege level checking mechanism 106 to enable the re-mapping to be dynamically performed in real time prior to privilege checking during execution. The novel dynamic re-mapping of privilege levels prior to privilege checking advantageously enables tasks to be executed with relative privilege level relationships that are different from what were nominally assigned to the tasks.

Except for the teachings of the present invention incorporated, processor 100 is otherwise intended to represent a broad range of processors known in the art. As will be readily apparent from the descriptions to follow, while FIG. 1 specifically illustrates the task register where a task's current privilege level, the present invention applies to privilege level in general, and may be practiced to dynamically alter the relative privilege relationship between memory segments, selectors, descriptors and the like. For ease of understanding, the remaining description will nevertheless continue to primarily refer to the task's CPL. Privilege checking mechanism 106 is intended to represent a broad range of privilege checking mechanisms or circuitry known in the art. It may enforce any one of a number privilege rules, as well as enforcing these rules in any one of a number of implementation manner. Neither the privilege rules being enforced nor the manner they are enforced are of particular relevance to the practice of the present invention. In fact, a major advantage of the present invention is the ability to introduce a new order of privilege relationship without requiring major re-design to the fundamental privilege protection mechanism of a processor nor the operating system that uses the processor.

Figure 2A:
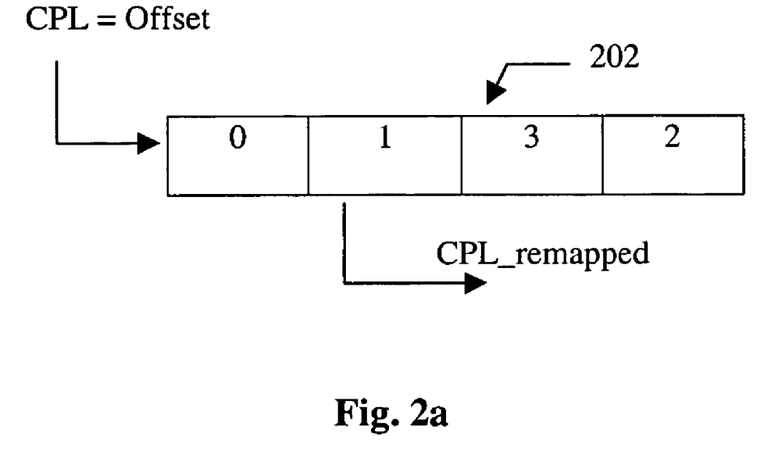
FIGS. 2a–2b illustrate the privilege level re-mapper in further detail, in accordance with two embodiments.
Figure 2B:
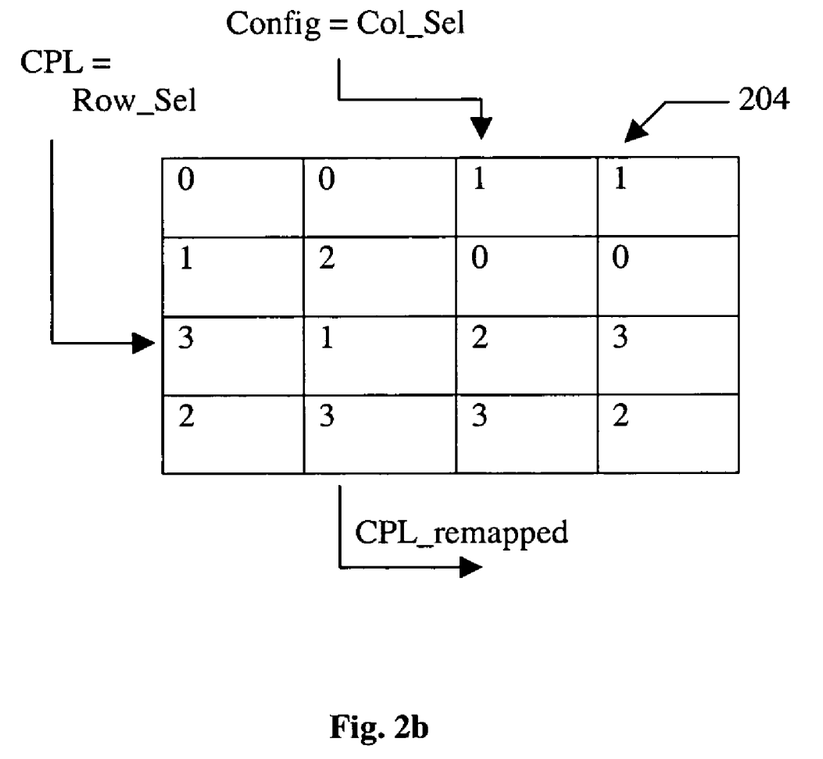

FIGS. 2a–2b illustrate task CPL re-mapper 104 in further detail, in accordance with two embodiments. FIG. 2a illustrates a basic embodiment, where a new control register 202 is used to re-map a task's CPL. As illustrated, the re-targeted privilege levels are stored in register 202, and they are selectively accessed and retrieved using the task CPL read out of task register 102 as an offset into register 202. As a result, a task having a CPL of "0" or "1" will retain the "0" or "1" CPL, whereas a task with a CPL of "2" will be re-mapped to a CPL of "3", and a task with a CPL of "3" will be re-mapped to a CPL of "2". Accordingly, the desired privilege level re-mapping, and relative privilege relationship re-ordering is achieved in accordance with the stored scheme.

FIG. 2b illustrates a more elaborate embodiment, where a memory storage array 204 is used to re-map a task's CPL. As illustrated, multiple sets of re-targeted privilege levels are stored in array 204, and they are selectively accessed and retrieved using the task CPL read out of task register 102 as a row pointer into array 204, in conjunction with a configuration signal serving as a column pointer into array 204. As a result, a task having a CPL of "0", "1", "2" or "3" may be re-mapped to "0", "1", "3" and "2" respectively as before, if the set stored in column 1 is used, or to "1", "0", "3" and "2" respectively, if the set stored in column 4 is used instead. Accordingly, the desired privilege level re-mapping, and relative privilege relationship re-ordering is achieved in accordance with one of the stored schemes.

The re-targeted privilege levels representing a re-mapping scheme may be "hard coded" into register 202 or array 204, or it may be loaded at power-on or reset as part of the initialization process. The configuration signal may be driven e.g. off a programmable configuration register (not shown).

Thus, it can be seen from the embodiments of FIGS. 2a–2b, the present invention may be practiced with a simple pre-determined re-mapping scheme or with a re-mapping scheme to be configurably determined from a rich or full set of all possible re-mappings.

Figure 3A:
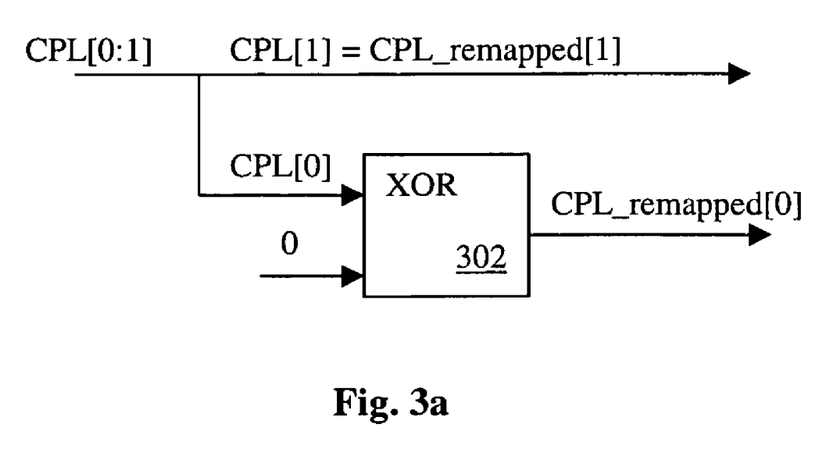
FIGS. 3a–3b illustrate the privilege level re-mapper in further detail, in accordance with another two embodiments.
Figure 3B:
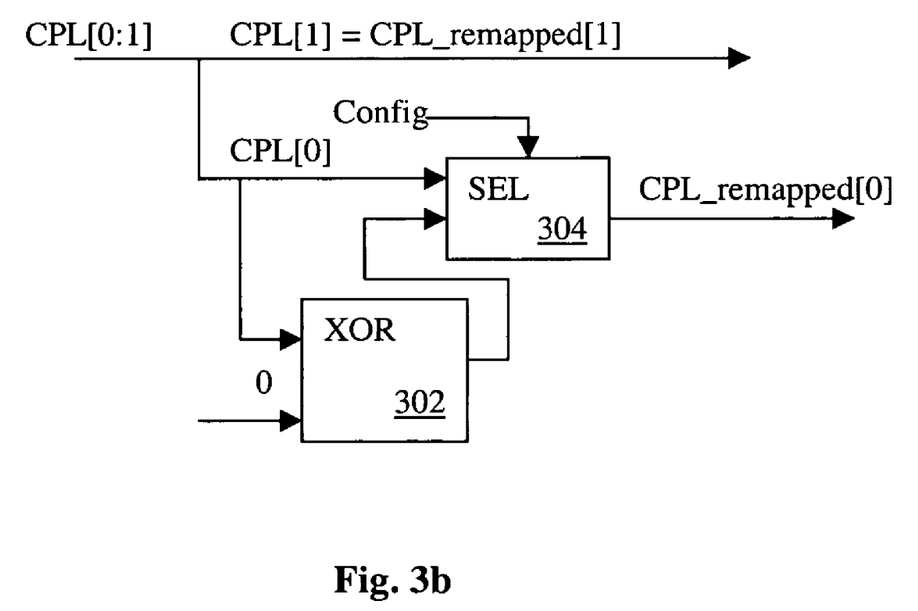

FIGS. 3a–3b illustrate task CPL re-mapper 104 in further detail, in accordance with another two embodiments. FIG. 3a achieves the same re-mapping as the embodiment of FIG. 2b if the set of re-targeted privilege levels stored in column 4 are used. Except, under FIG. 3a, the re-mapping is achieved through a combinatorial circuit element, XOR gate 302. More specifically, the lower order bit of a task's CPL is XOR'd with the value "0" to alter it, while the higher order bit is retained. Effectively, a task with CPL "00", "01", "10" and "11" (0, 1, 2, 3 in decimal) will be re-mapped to "01", "00", "11" and "10" (1, 0, 3, 2 in decimal).

FIG. 3b may achieve a number of re-mappings possible under the earlier described embodiments. Except, under FIG. 3b, the re-mapping is also achieved through a combinatorial circuit element, XOR gate 302. In addition to XOR gate 302, the embodiment of FIG. 3b is also provided with selector 304 to allow the selective retaining of the original lower bit or the employment of the altered lower bit. Selector 304 selects either the original lower bit or the altered lower bit in accordance with a configuration signal. The original lower bit (or the altered lower bit) may be selected with the configuration signal equals "0" or "1". The manner of selection is immaterial. Thus, if configuration signal always selects the original lower bit, re-mapping is effectively disabled. On the other hand, if configuration signal is conditionally driven to select the altered lower bit, depending on whether the lower bit is "1" or "0", it achieves the same re-mapping offered by the embodiment of FIG. 2*b* employing column 1 (which is the same as the embodiment of FIG. 2*a*), or the re-mapping offered by the embodiment of FIG. 2*b* employing column 3. Finally, if configuration signal always selects the original altered lower bit, the embodiment of FIG. 3*b* is effectively the same as the embodiment of FIG. 3*a*.

Similarly, configuration signal may be driven from a programmable configuration register, or outputs of other combinatorial circuits. Thus, it can be seen that various re-mapping may also be achieved through combinatorial circuits. The embodiments of FIGS. 3*a*–3*b* are kept simple for ease of understanding. However, those skilled in the art will be able to extend from these embodiments to allow even more flexible re-mapping of various kinds.

Figure 4:
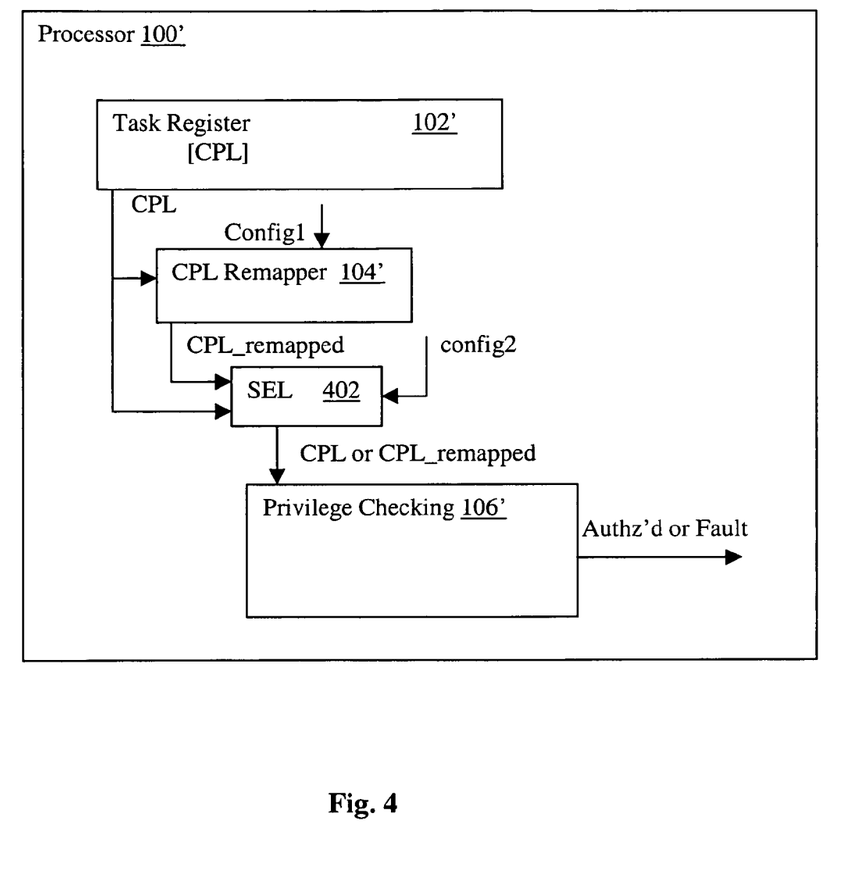
FIG. 4 illustrates another overview of the present invention, in accordance with another embodiment.

FIG. 4 illustrates another overview of the present invention, in accordance with another embodiment. The embodiment of FIG. 4 is essentially that of the embodiment of FIG. 1, except for the provision of selector 402 to allow the re-mapping to be selectively enabled and disabled. In other words, the inclusion of selector 402 enables the present invention to be configurably included or excluded.

Figure 5:
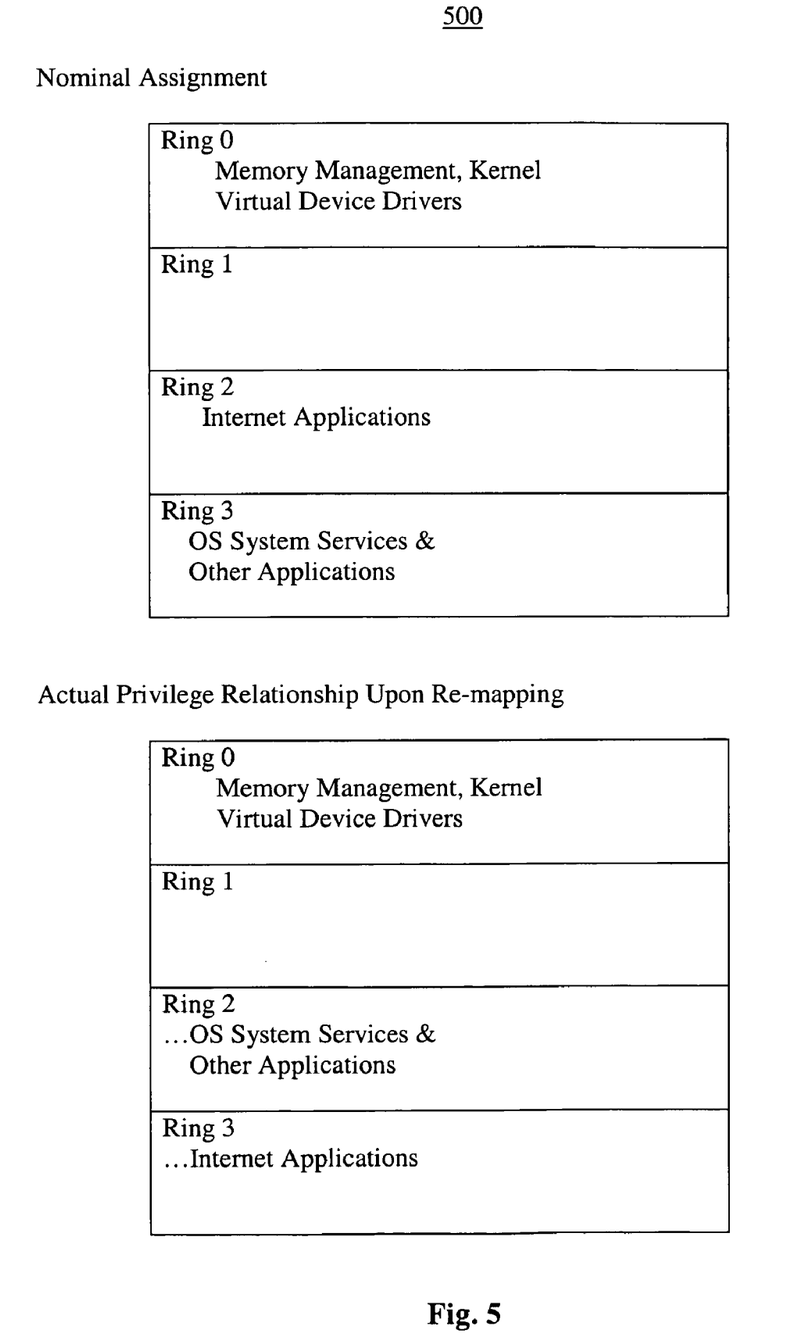
FIG. 5 illustrates an example application of the present invention.

FIG. 5 illustrates an example application of the present invention. As illustrated, in this example application, the kernel, the virtual device driver and the memory manager of an operating system are nominally attributed with task CPL "0", enabling them to execute in privilege ring 0, whereas other operating system services, as well as "trustworthy" applications are nominally attributed with task CPL "3", confining them to execute in privilege ring 3. Untrustworthy applications, such as Internet applications, are nominally attributed with task CPL "2', enabling them to execute in the more privileged ring 2.

However, employing the present invention, the privilege levels are dynamically re-mapped, enabling the relocation of the operating system services and trustworthy applications to the more privileged ring 2, and confining the untrustworthy Internet application to the least privileged ring 3 instead.

What constitutes trustworthiness is application dependent. Their demarcation is immaterial for the practice of the present invention. Further, the term "privilege ring" or "ring" as used herein is intended to include its conventional meaning that a program afforded a more inner privilege ring typically has privileges inclusive that of another program afforded a more outer privilege ring.

Thus, it can be seen under the present invention, a class of lesser privileged tasks can be carved out of the existing least privileged tasks. The new least privileged tasks will first be nominally given a more privileged level. But, at execution time, the privilege levels of the residual former least privileged tasks and the new least privileged tasks are re-mapped (prior to privilege checking), and re-ordered to the desired relative privilege relationship. Likewise, the same may be performed at the other end of the privilege spectrum. That is, a class of more privileged tasks can be carved out of the existing most privileged tasks. The new more privileged tasks will first be nominally given a lesser privilege level. But, at execution time, the privilege levels of the residual former most privileged tasks and the new more privileged tasks are re-mapped (prior to privilege checking), and re-ordered to the desired relative privilege relationship.

Figure 6:
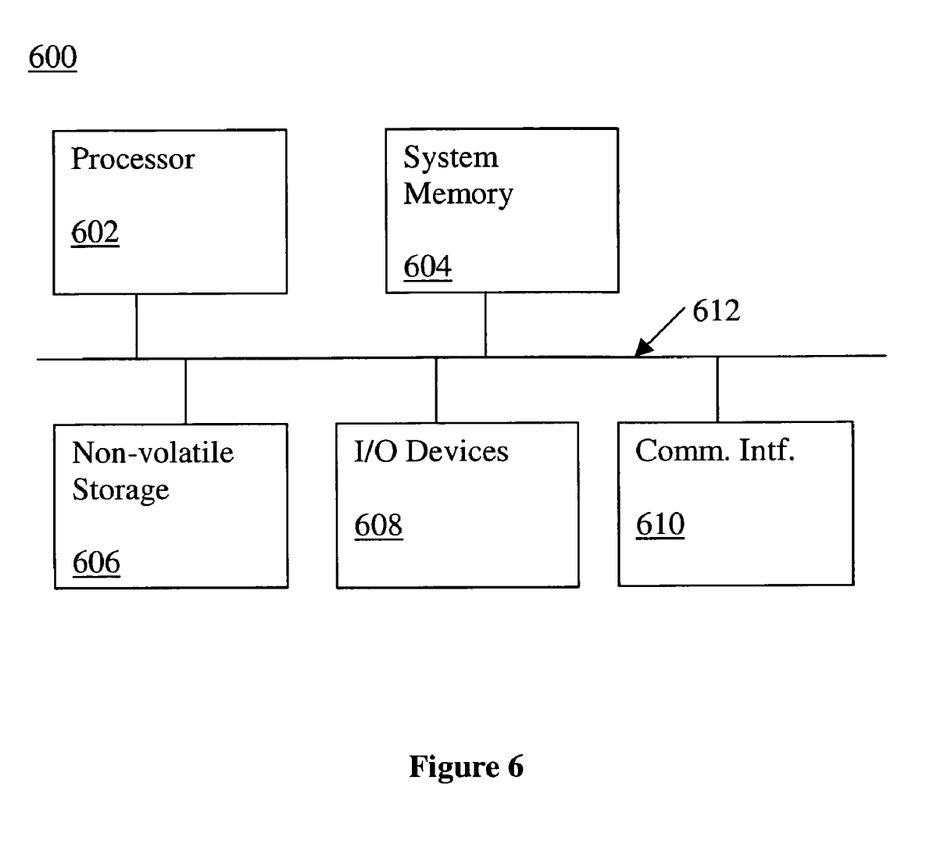
FIG. 6 illustrates an example system incorporated with the processor of the present invention.

Referring now to FIG. 6, wherein a block diagram illustrating an example system incorporated with the teachings of the present invention is shown. System 600 is intended to represent a broad range of digital systems or devices known in the art, including but not limited to computer systems of all form factors (from palm-sized, to laptop, desktop and racked mounted servers), telecommunication devices such as wireline or wireless telephones, or entertainment devices such as set top devices, and the like. As shown, example system 600 includes processor 602, system memory 604 coupled to each other via "bus" 612. Coupled also to "bus" 612 are non-volatile storage 606, input/output device 608 and communication interface 610.

Processor 602 may be the processor of FIG. 1, FIG. 4, and other equivalents. Each of the other enumerated elements is intended to represent a wide range of the respective devices/elements known in the art. For example, system memory 604 may be SDRAM, DRAM and the like, from semiconductor manufacturers such as Micron Technology of Boise, Id. Bus 612 may be a single bus or a multiple bus implementation. In other words, bus 612 may include multiple buses of identical or different kinds properly bridged, such as Local Bus, VESA, ISA, EISA, PCI and the like. Non-volatile storage 606 may be disk drives or CDROMs from manufacturers such as Seagate Technology of Santa Cruz of CA, and the like. Input/Output devices 608 may include input devices, such as keypads, key boards, or cursor control devices like a mouse, a track ball and so forth, from vendors such as Logictech of Milpitas, Calif., and output devices like display devices such as LCD displays, flat panel displays or monitors of any types, from vendors such as Viewsonic of Walnut, Calif. Communication interface 610 may be a wireless interface, or a wireline interface, such as modem interface, an ISDN adapter, a DSL interface, an Ethernet or Token ring network interface and the like, from vendors such as 3COM of San Jose, Calif.

Thus, a method and apparatuses for protectively operating a data/information processing system has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A processor comprising:
   a control register accessible to an operating system to store a current privilege level to attribute an execution privilege level to a task for the processor; and
   a privilege remapper coupled to the control register and configured to remap a current privilege level stored in the control register for the task by the operating system, to a different current privilege level attributing a different execution privilege level to the task for the processor, the remapping being performed independent of the operating system.

2. The processor of claim 1, wherein the privilege remapper comprises a register to store a plurality of remapped current privilege levels to be accessed using the stored current privilege level prior to runtime privilege checking.

3. The processor of claim 1, wherein the privilege remapper comprises a storage array to store a plurality of remapped current privilege levels to be accessed using a configuration value and the stored current privilege level prior to runtime privilege checking.

4. The processor of claim 1, wherein the privilege remapper comprises one or more logical elements to logically alter one or more bits of the stored current privilege level prior to runtime privilege checking.

5. The processor of claim 1, wherein the privilege remapper further comprises at least one selector coupled to at least one of the one or more logical elements to effectuate conditional performance of said logical alteration for at least one bit of the stored current privilege level prior to runtime privilege checking.

6. The processor of claim 1, wherein the processor further comprises at least one selector coupled to the control register and the privilege remapper to effectuate conditional performance of said remapping of the stored current privilege level prior to runtime privilege checking.

7. A method comprising:
accessing a control register of a processor, the control register being also accessible to an operating system and employed by the operating system to store a first current privilege level to attribute an execution privilege level to a task for the processor; and
remapping the first current privilege level to a second current privilege level to attribute a different execution privilege level to the task for the processor, the remapping being performed independent of the operating system.

8. The method of claim 7, wherein said remapping comprises accessing a register to retrieve one of a plurality of remapped current privilege levels stored in said register, using the stored first current privilege level, prior to runtime privilege checking.

9. The method of claim 7, wherein said remapping comprises accessing a storage array to retrieve one of a plurality of remapped current privilege levels stored in said storage array in a set-wise manner, using a configuration value and the stored first current privilege level, prior to runtime privilege checking.

10. The method of claim 7, wherein said remapping comprises logically altering one or more bits of the stored first current privilege level, prior to runtime privilege checking.

11. The method of claim 10, wherein said altering being conditionally performed.

12. The method of claim 7, wherein said remapping being conditionally performed.

13. In a processor having a 4-ring privilege protection scheme, where tasks attributed with a lower ring current privilege level is more privileged than tasks attributed with a higher ring current privilege level, a method comprising:
attributing a ring-2 current privilege level to a first task for an operating system, nominally giving said first task more privilege than a second plurality of tasks which are attributed with a ring-3 current privilege level for an operating system; and
remapping each ring-2 current privilege level to a ring-3 current privilege level, and each ring-3 current privilege level to a ring-2 current privilege level prior to runtime privilege checking to cause said first task to execute in fact with less privileges than said second plurality of tasks, the remapping being performed independent of the operating system.

14. The method of claim 13, wherein said first task is associated with an Internet application.

15. The method of claim 13, wherein said second plurality of tasks are associated with an operating system.

16. A method comprising:
accessing a storage location employed by an operating system to store a first current privilege level to attribute a first execution privilege level to a first collection of programming instructions for a processor, said first current privilege level being different from a second current privilege level the operating system stores into the storage location at a different point in time to attribute a second execution privilege level to a second collection of programming instructions for the processor, resulting in said first collection of programming instructions to be executed by the processor with a first relative current privilege relationship to said second collection of programming instructions; and
remapping said first current privilege level to a third current privilege level to cause the first collection of programming instructions to be executed by the processor with a second different relative current privilege relationship to said second collection of programming instructions, the remapping being performed independent of the operating system and prior to runtime privilege checking, the runtime privilege checking being performed prior to the processor executing a collection of programming instructions.

17. A method comprising:
accessing a storage location employed by an operating system to store a first current privilege level to attribute a first execution privilege level to a first collection of programming instructions for a processor, said first current privilege level being different from a second current privilege level stored into the storage location by the operating system at a different point in time to attribute a second execution privilege level to a second collection of programming instructions, to result in said first collection of programming instructions to be executed by the processor with a first relative current privilege relationship to said second collection of programming instructions; and
remapping, independently of the operating system, said first current privilege level to said second current privilege level to cause the first collection of programming instructions to be executed by the processor with a second different relative current privilege relationship to said second collection of programming instructions, the second current privilege level attributed to said second collection of programming instructions to be remapped to a third current privilege level.

18. The method of claim 17, wherein said first and third current privilege levels are the same current privilege level.

19. A method comprising:
remapping, independently of an operating system, a more privileged current privilege level attributed by the operating system to a first least privileged task to be executed by a processor to a least privileged current privilege level prior to the execution of the first least privileged task by the processor; and
remapping, independently of the operating system, a least privileged current privilege level attributed by the operating system to a second least privileged task to be executed by the processor to a more privileged current privilege level prior to the execution of the second least privileged task by the processor.

20. The method of claim 19, wherein the method further comprises the operating system attributing said least privileged current privilege level to said second least privileged task, and said more privileged current privilege level to said first least privileged task.

21. A method comprising:
remapping, independently of an operating system, a first lesser privileged current privilege level attributed by the operating system to a first most privileged task to be executed by a processor to a most privileged current privilege level prior to the execution of the first most privileged task by the processor; and remapping, independently of the operating system, a most privileged current privilege level attributed by the operating system to a second most privileged task to be executed by the processor to a lesser privileged current privilege level, prior to the execution of the second most privileged tasks.

22. The method of claim 21, wherein the method further comprises the operating system attributing said most privileged current privilege level to said second most privileged task, and said lesser privileged current privilege level to said first most privileged task.

23. A processor comprising:
a control register accessible to an operating system having an instruction to store a current privilege level to attribute an execution privilege level to a task for the processor; and
a privilege remapper coupled to the control register and configured to remap a current privilege level stored into the control register by the operating system to a different current privilege level, the remapping being performed prior to runtime privilege checking, independent of the operating system, the instruction and the task.

24. The processor of claim 23, wherein the processor further comprises at least one selector coupled to the control register and the privilege remapper to effectuate conditional performance of said remapping of the stored current privilege level prior to runtime privilege checking.

25. An apparatus comprising:
a control register accessible to an operating system having an instruction to store a current privilege level to attribute an execution privilege level to a task for the processor; and
a privilege remapper coupled to the control register and configured to remap a current privilege level stored into the control register by the operating system to a different current privilege level, the remapping being performed prior to runtime privilege checking, independent of the operating system, the instruction, and the task.

26. The apparatus of claim 25, wherein the apparatus further comprises at least one selector coupled to the control register and the privilege remapper to effectuate conditional performance of said remapping of the stored current privilege level prior to runtime privilege checking.

27. A method comprising:
remapping a ring-2 current privilege level stored in a storage location by an operating system to attribute an execution privilege level to a first task for a processor having a 4-ring privilege scheme, to a ring-3 current privilege level to attribute a lower execution privilege level to the first task; and
remapping a ring-3 current privilege level stored in a storage location by the operating system to attribute an execution privilege level to a second task for the processor, to a ring-2 current privilege level to attribute a higher execution privilege to the second task;
wherein both remapping are performed independent of the operating system.

28. The method of claim 27, wherein said first task is associated with an Internet application.

29. The method of claim 27, wherein said second task is associated with the operating system.

* * * * *